Jan. 14, 1930.　　A. BARR ET AL　　1,743,952
TOPOGRAPHICAL STEREOSCOPE
Filed Nov. 16, 1927　　2 Sheets-Sheet 1
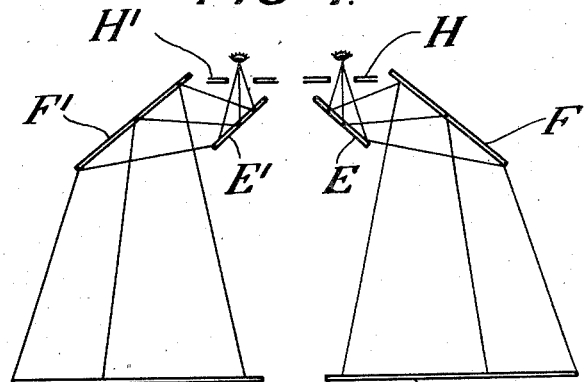
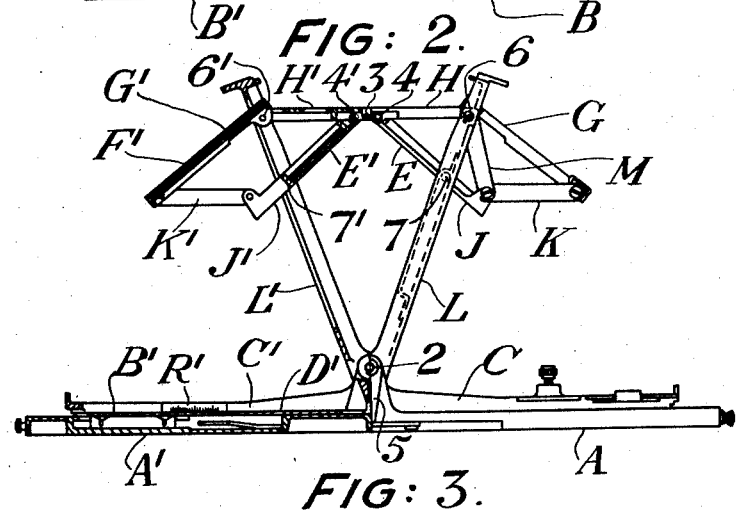
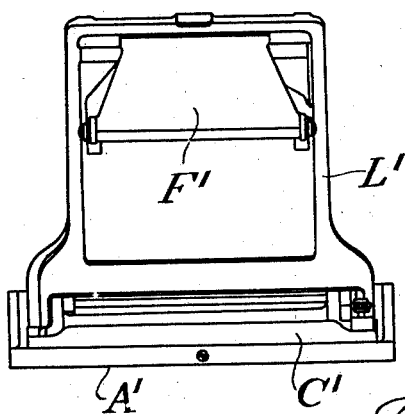
INVENTORS.
Archibald Barr and William Stroud
By O'Neill & Bunn
ATTORNEYS.

Jan. 14, 1930. A. BARR ET AL 1,743,952
TOPOGRAPHICAL STEREOSCOPE
Filed Nov. 16, 1927 2 Sheets-Sheet 2
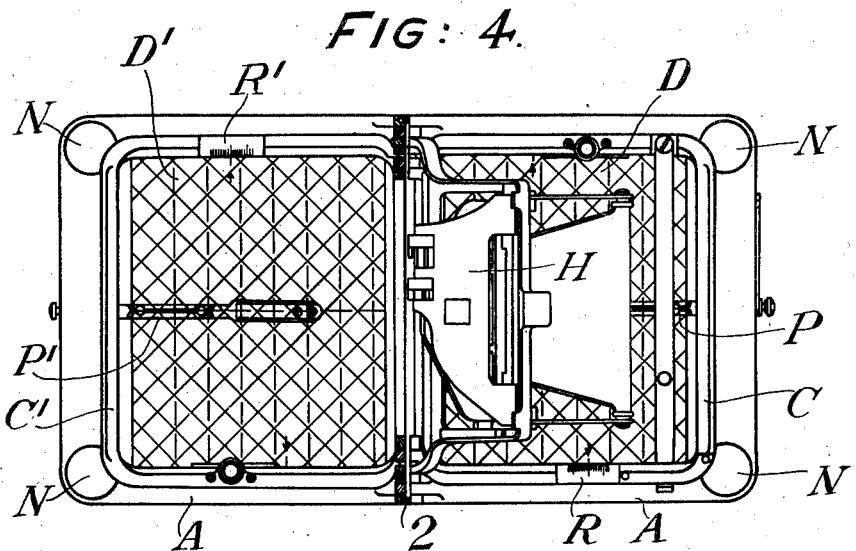
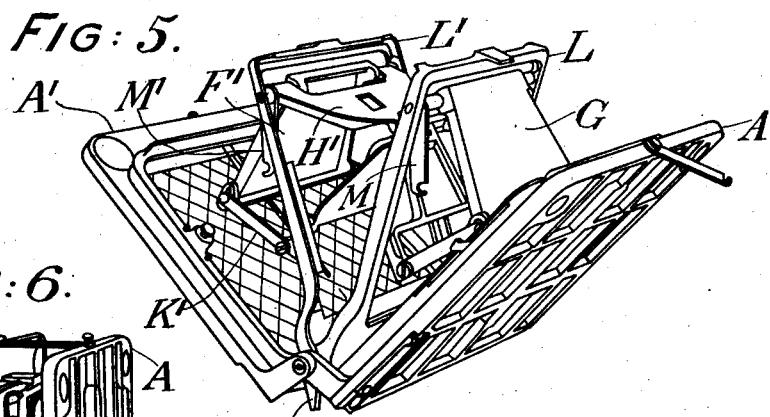
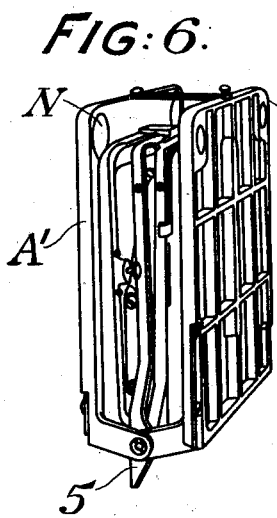
INVENTORS.
Archibald Barr & William Stroud,
By O'Neill & Bunn.
ATTORNEYS.

Patented Jan. 14, 1930

1,743,952

UNITED STATES PATENT OFFICE

ARCHIBALD BARR AND WILLIAM STROUD, OF ANNIESLAND, GLASGOW, SCOTLAND, ASSIGNORS TO BARR AND STROUD, LIMITED, OF GLASGOW, SCOTLAND

TOPOGRAPHICAL STEREOSCOPE

Application filed November 16, 1927, Serial No. 233,590, and in Great Britain December 2, 1926.

This invention relates to new or improved means for examining stereoscopically a pair of photographs of a landscape or other scene, as seen from two stations some distance apart, for example, for the examination of a pair of photographs taken more or less vertically downwards from two positions of an aeroplane, or of a pair of photographs taken more or less horizontally from two stations near the ground.

According to this invention a topographical stereoscope comprises, two panels hinged together, the panels being for receiving a pair of photographs which are to be examined, frames carrying glass plates which lie over the photographs, the glass plate frames being hinged relatively to the panels, two pairs of mirrors by means of which the photographs placed on the panels may be viewed stereoscopically, frames for the mirrors connected together by linkages adapted to hold the mirrors in the correct positions relative to each other, and stay members adapted to hold the mirror systems in their correct positions relatively to the base members, the whole arrangement being such that it can be folded up into small space when not in use.

An example of an instrument according to this invention will now be described with reference to the accompanying drawings, in which:—

Figure 1 is a diagrammatic representation of the optical system.

Figure 2 is a view showing the right hand half of the instrument in front elevation and the left hand half in section.

Figure 3 is an end elevation.

Figure 4 is a view showing the right hand side of the instrument in plan and the left hand side of the instrument in plan with its mirror system removed.

Figure 5 is a view showing the instrument partly collapsed.

Figure 6 is a view showing the instrument completely folded up.

The instrument illustrated comprises two panels A $A^1$ to receive the two photographs B $B^1$. When in use the panels A $A^1$ lie side by side, their surfaces extending as one plane, and for the purpose of description they may be considered as resting flat on a table. The panels are hinged together at 2, the axis of the hinge 2 being some distance above the surface plane of the panels A $A^1$ so that when the panels are folded by being turned up parallel to each other there is sufficient distance between them to accommodate the folded other parts of the instrument. Above the panels there are frames C $C^1$ carrying glass plates D $D^1$, the under sides of plates D $D^1$ being adapted to lie in contact with the photographs B $B^1$ on the panels A $A^1$. The glass plates D $D^1$ have on their under sides a set of lines forming a grid or some other set of marks, those on the two plates corresponding to each other. The set of marks when seen stereoscopically will be referred to as the "net". The plates D $D^1$ may be slidable in the frames C $C^1$, enabling them to be moved nearer to or farther from each other, so that the grids can be moved relatively to the photographs. The frames C $C^1$ holding the plates D $D^1$ are hinged to the panels A and $A^1$, conveniently on the same axis 2. At a convenient height above the panels A $A^1$ (say 6 inches or so) a pair of mirrors E $E^1$, which will be referred to as the "eye mirrors", are carried, set at an inclination of, say, 45° looking upwards and with their centres at about 1¼ inch from the vertical through the hinge axis 2. Outwards from the eye mirrors E $E^1$ there is another pair of mirrors F $F^1$, which will be referred to as the "object mirrors", roughly parallel to the eye mirrors E $E^1$ looking downwards and with their centres set at about the distance apart of the centres of the panels A $A^1$. Thus, if the eyes of an observer are directed downwards, see Figure 1, towards the eye mirrors E $E^1$, photographs B $B^1$ lying on the panels A $A^1$ are seen stereoscopically superimposed on each other and the grids are also seen superimposed upon each other and upon the photographs.

The arrangement illustrated shows two frames G $G^1$, carrying the object mirrors F $F^1$, and two frames J $J^1$ carrying the eye mirrors E $E^1$. The upper (and inner) edges of the frames J $J^1$ are hinged together at 3, the hinge lying in the vertical plane through the hinge 2 and a little under the intersection of the planes of the frames J J$^1$. Two plates H H$^1$, parallel or approximately parallel to the panels A A$^1$, constituting what may be called a facepiece, the plates having holes through which the eyes are directed downwards. Plates H H$^1$ are hinged at 4 4$^1$ to the frames J J$^1$ near the hinge at 3. Frames G G$^1$ are hinged to the plates H H$^1$ at 6 6$^1$. Frames G G$^1$ are connected together at their inner (and upper) edges by the plates H H$^1$ and parts of J J$^1$. The lower edge of each frame J J$^1$ and its corresponding frame G G$^1$ are kept at the proper distance apart by connecting rods K K$^1$. The frames G$^1$ J$^1$ with the plate H$^1$ and connecting rod K$^1$, see Figure 2, constitute a linkage of parallelogram form so that these parts may be folded up to occupy a small space as regards thickness. The frames G J, plate H and rod K are similar. A pair of frames L L$^1$, which may be called "stay frames", are hinged together and to the panels A A$^1$ at the axis 2 and lie directed outwards from each other. The position which they take up projecting upwardly from the panels may be controlled by projections 5 below the hinge, which projections are caught by the inner edges of the panels A A$^1$ when these are lying flat. The parts G H, G$^1$ H$^1$ are carried by the stay frames L L$^1$, being hinged thereto by hinge pins 6 6$^1$ which also connect the plates H H$^1$ to the frames G G$^1$. The planes of the stay frames L L$^1$ cut the frames J J$^1$ near their outer (lower) edges at 7 7$^1$ and at these places guides are provided, for example, pins may be provided projecting from the frames J J$^1$ to slide in slots in the stay frames L L$^1$ lying radially from the axis 2. The upper (inner) edges of the frames G G$^1$ may be connected to the lower (outer) edges of the frames J J$^1$ by disconnectible connecting rods M M$^1$ which when in place keep the systems of mirrors in their correct relative positions. The whole is so arranged that when the rods M M$^1$ are released, the parts can be made to collapse into a small space practically in the plane of the stay frames L L$^1$ and the whole is enclosed between the panels A A$^1$ when these are hinged up into parallelism.

In use, a pair of photographic prints B B$^1$, printed from negatives taken from the two ends of a base, are placed on the panels A A$^1$ and moved into the correct relative attitudes and at such a distance apart that corresponding points on the two photographs can be readily "fused" stereoscopically. It is convenient to pin the centre points (principal points) of the two photographs to sliders P P$^1$ which move in grooves along the centres of the panels A A$^1$, in line with each other; the prints can then be rotated about these pins and translated towards or from each other as may be required for easy "fusing". The prints may then be fastened to the panels, say, clipped or pinned. If the panels A A$^1$ are of metal, wooden insets N may be provided in the panels to take the pins.

The systems of markings, say grid lines on the undersides of the two glass plates being alike, when seen stereoscopically appear as a flat level net stretched over the field of view. When the grid plates D D$^1$ are moved towards or from each other, the net appears to move towards or from the observer and its apparent distance may be made to correspond to the apparent distance of any point on the landscape viewed. By this means the relative distances of various objects in the landscape may be judged and the form and position of contour lines on the ground may be observed. When the direction and position of a contour line at any part of the landscape have been seen, one of the grid plate frames, say C, with its grid plate D, may be hinged up so that a pencil may be used to mark on the photograph the contour line referred to. Scales R R$^1$ may be provided to indicate the position of the grid plates D D$^1$ in any setting with reference to their frames and therefore with reference to the photographs.

As has been stated, the instrument can also be used for examining two horizontal photographs and judging and more or less measuring by means of the grid plates the distances of various features in the landscape.

We claim:—

1. A topographical stereoscope comprising two picture holding panels hinged together for adjustment in either the same plane or into parallel planes, stay frames pivoted to the hinged axis of the panels, parallel motion linkages pivoted to said stay frames near the top of the latter and hinged together in the vertical plane through the hinged axis of the panels, object mirrors mounted on one side of the respective linkages and facing the respective panels, and eye mirrors mounted on the opposite sides of the respective linkages and facing the object mirrors.

2. A topographical stereoscope comprising two picture holding panels hinged together for adjustment in either the same plane or into parallel planes, glass plates mounted in said panels, stay frames pivoted to the hinged axis of the panels, parallel motion linkages pivoted to said stay frames near the top of the latter and hinged together in the vertical plane through the hinged axis of the panels, object mirrors mounted on one side of the respective linkages and facing the respective panels, and eye mirrors mounted on the opposite sides of the respective linkages and facing the object mirrors.

3. A topographical stereoscope comprising two picture holding panels hinged together on an axis above the surface plane of the panels for adjustment in either the same plane or into parallel planes, stay frames pivoted to the hinged axis of the panels, parallel motion linkages pivoted to said stay frames near the top of the latter and hinged together in the vertical plane through the hinged axis of the panels, object mirrors mounted on one side of the respective linkages and facing the respective panels, and eye mirrors mounted on the opposite sides of the respective linkages and facing the object mirrors.

4. A topographical stereoscope comprising two picture holding panels hinged together for adjustment in either the same plane or into parallel planes, glass plates mounted in said panels, means for adjusting said plates toward and from the hinged axis of the panels, stay frames pivoted to the hinged axis of the panels, parallel motion linkages pivoted to said stay frames near the top of the latter and hinged together in the vertical plane through the hinged axis of the panels, object mirrors mounted on one side of the respective linkages and facing the respective panels, and eye mirrors mounted on the opposite sides of the respective linkages and facing the object mirrors.

5. A topographical stereoscope comprising two picture holding panels hinged together for adjustment in either the same plane or into parallel planes, glass plates mounted in said panels, means for adjusting said plates toward and from the hinged axis of the panels, stay frames pivoted to the hinged axis of the panels, parallel motion linkages pivoted to said stay frames near the top of the latter and hinged together in the vertical plane through the hinged axis of the panels, object mirrors mounted on one side of the respective linkages and facing the respective panels, and eye mirrors mounted on the opposite sides of the respective linkages and facing the object mirrors, said plates having markings thereon for the purpose set forth.

6. A topographical stereoscope comprising two picture holding panels hinged together for adjustment in either the same plane or into parallel planes, stay frames pivoted to the hinged axis of the panels, parallel motion linkages pivoted to said stay frames near the top of the latter and hinged together in the vertical plane through the hinged axis of the panels, object mirrors mounted on one side of the respective linkages and facing the respective panels, eye mirrors mounted on the opposite sides of the respective linkages and facing the object mirrors, and means for locking the stay frames in operative position.

7. A topographical stereoscope comprising two panels hinged together, the two panels being relatively movable angularly about the axis of the hinge for extension side by side, their surfaces extending as one plane, or for folding, their surfaces being substantially parallel to each other and at a distance apart, two glass plates one for each panel, corresponding markings on the undersides of the plates, the glass plates being slidable nearer to or farther from each other, a pair of eye mirrors, a pair of object mirrors, frames for the mirrors, linkages for the frames of the mirrors, and stay frames extending from the panels for supporting the frames of the mirrors, said frames being movable angularly whereby the mirrors may be set angularly for use or folded substantially parallel to one another, the eye mirrors and the object mirrors with their frames being situated in the angular space through which the panels are movable and when folded containable between the folded panels, for the purposes set forth.

8. A topographical stereoscope comprising two panels hinged together, the axis of the hinge being above the surface plane of the panels, the two panels being relatively movable angularly about the axis of the hinge for extension side by side, their surfaces extending as one plane, or for folding, their surfaces being substantially parallel to each other and at a distance apart, two glass plates, one for each panel, corresponding markings on the undersides of the plates, the glass plates being slidable nearer to or farther from each other, a pair of eye mirrors, a pair of object mirrors, frames for the mirrors, frames for the glass plates, linkages for the frames of the mirrors, and stay frames extending from the panels for supporting the frames of the mirrors, said frames being movable angularly whereby the mirrors may be set angularly for use or folded substantially parallel to one another, the eye mirrors and the object mirrors with their frames being situated in the angular space through which the panels are movable and when folded containable between the folded panels, for the purposes set forth.

9. A topographical stereoscope comprising two panels hinged together, the axis of the hinge of the panels being above the surface plane of the panels, the two panels being relatively movable angularly about the axis of the hinge for extension side by side, their surfaces extending as one plane, or for folding, their surfaces being substantially parallel to each other and at a distance apart, two glass plates, one for each panel, corresponding markings on the undersides of the plates, the glass plates being slidable nearer to or farther from each other, a pair of eye mirrors, a pair of object mirrors, frames for the mirrors, frames for the glass plates, linkages for the frames of the mirrors, and stay frames extending from the panels for supporting the frames of the mirrors, the frame for the glass plates and the stay frames being hinged about the axis of the hinge of the panels, said frames being movable angularly whereby the mirrors may be set angularly for use or folded substantially parallel to one another, the eye mirrors and the object mirrors with their frames being situated in the angular space through which the panels are movable and when folded containable between the folded panels, for the purposes set forth.

ARCHIBALD BARR.
WILLIAM STROUD.